Inventor
W. G. Wilson
By Glascock Downing & Seebirt
Attys.

Patented Dec. 10, 1946

2,412,486

UNITED STATES PATENT OFFICE 2,412,486

STEERING DEVICE FOR AIRCRAFT OR OTHER VESSELS

Walter Gordon Wilson, Martyr Worthy, near Winchester, Hampshire, England

Application November 17, 1942, Serial No. 465,880
In Great Britain May 23, 1941

21 Claims. (Cl. 114—144)

This invention relates to the steering of air or water craft, torpedoes and the like, and particularly to such craft of the type that have the inherent tendency to oscillate transversely at regular periodicity in relation to a given track line of flight.

Electrically actuated means have been proposed to correct any deviation off the course.

By such electrical means when a deviation is detected and before it develops, a correction of rudder is made which will anticipate and prevent the full deviation with the result that the curve is smoothed out and the normal sinuous track line is resumed.

The invention hereinafter described is a development of the invention set out in the specification of my prior United States patent application Serial No. 448,506 according to which the rudder movement was effected by a pair of bellows to which a supply of air was regulated by the action of a pivoted intercepter valve comprising a shield, which under gyroscopic influence was movable to and fro between pairs of jets so that air pressure could pass alternatively to either of the bellows and thus move the rudder to either port or starboard as the case might be.

The object of the present invention is to correct a deviation off course by the use of mechanical devices to be actuated to cause the restoration of the intercepter shield to lag behind the rudder deflection, and thus prevent further development of the deviation that has commenced.

The invention consists in a mechanical follow-up mechanism interposed between the bellows actuated tiller lever and the intercepter valve, said mechanism comprising a damping element and/or an inertia element coupled through resilient or yielding means with incoming and outgoing transmission members by means of which mechanism the interceptor valve is stabilised, after it has been initially opened by a commencing deviation to give a large amount of helm.

The invention also consists in a mechanical follow-up mechanism, which after it has stabilised the interceptor valve, re-opens the interceptor valve by the subsequent rendering action of the mechanism to reduce the amount of helm, to give permanent helm, or opposite helm.

The invention also consists in a steering device in which a relay by acting upon the tiller causes the latter through rendering devices to act upon the rudder, so that the latter for a substantially equal amplitude of movement of the tiller will automatically assume different positions depending on the forces acting externally upon the rudder such as the speed of the vessel or projectile, the density of the medium in which it is moving or the position of the centre of pressure.

It is to be understood that:

(1) The term "deviation" refers to the lateral distance of the craft from its desired track.

(2) The term "deflection" means the angular departure of the craft from the desired course.

(3) A rendering device consists of a plurality of resiliently or yieldingly connected members adapted to receive and absorb an incoming movement and resolve it into an outgoing movement of variable degree and speed.

(4) Permanent helm means the application of rudder to correct a constant tendency of the craft to deflect in one direction.

(5) The term "stabilised" hereafter used refers to the interceptor valve as having been moved into a position wherein the bellows are static.

The invention will now be described with reference to the accompanying drawings, in which:

Figures 11 and 12 illustrate on an enlarged scale and detached from Figure 1 a rendering transmission train between the tiller and the interceptor valve.

Figures 15, 16 and 17 show in elevation other forms of rendering devices.

Figure 18 shows a detail modification hereinafter referred to, and

Figure 19 is a diagram of a course line to be followed by a vessel as hereinafter explained.

Figures 1, 2, 3, 13:
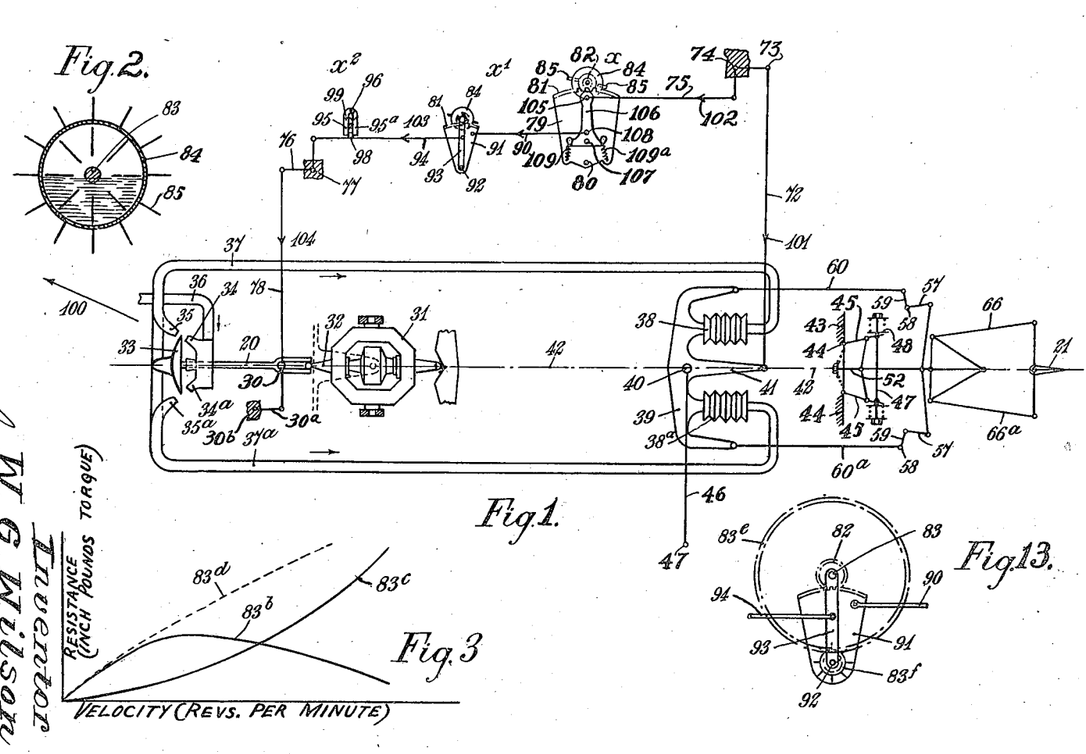
Figure 1 is a diagrammatic view of the means for controlling and stabilising an aerial torpedo as described in the specification of my prior United States application above referred to, supplemented by a mechanical follow up train for controlling the rudder according to the present invention.
Figure 2 is a detail view of a combined damping and inertia device.
Figure 3 shows a graph of certain spring resistance curves.
Figure 13 is a diagrammatic view of a modified rendering device.

Reference will now be made to Figure 1 which illustrates the general lay out of steering mechanism as described in the specification of my prior application above referred to and with which is combined the devices operating according to the present invention.

Referring to Figure 1, whenever the craft, as described in my prior specification, deviates from its proper course, a lever 20 universally jointed at 30 is oscillated by the resistance offered by a gyroscope 31, rotating around an axis stationary in space, the pin 32 of which engages one end of the lever. The lever 20 is pivoted at the point 30 on a rod 78 connected at one end with a bell crank 76 and at the other end with a link 30a pivoted at 30b. The lever 20, its fulcrum 30 and the gyroscope 31 all move with the ship when it deviates, but the spinning axis of the gyroscope being constant in direction, causes relative movement between the pin 32 and the end of the lever thereby oscillating the latter about the point 30. The other end of the lever carries a shield 33 of very light weight, forming part of a sphere (as shown in Figure 1) or part of a cylinder, which is adapted to intercept or permit communication between two sets of aligned nozzles 34 and 35 and 34a and 35a, to the former 34 and 34a of which compressed air is supplied by a duct 36. These are therefore supply nozzles feeding into receiver nozzles 35 and 35a.

Depending upon the direction of the swing of the shield, so the set of nozzles 34 and 35 or 34a and 35a are uncovered and allow air to pass from one open nozzle to the corresponding received nozzle, after which the air is led away by ducts 37, 37a to a servo motor device comprising bellows 38 and 38a or equivalent means, such as a cylinder and piston. The shield 33 thus acts as an interceptor valve by which one of a pair of bellows is expanded and thus directly actuates a tiller lever 39, fulcrummed at 40. The opposite ends of the tiller lever in the arrangement disclosed in the above mentioned application Serial No. 448,506 are connected respectively by cables to the ends of a two armed lever on the fulcrum of which the rudder is carried. The fulcrum point 40 of the tiller lever 39 is adapted to have a floating movement under the control of a link 46 centered at 47, and when one of the bellows 38 or 38a is expanded by a jet of air passed into either of the receiving nozzles 35 or 35a, so the tiller lever is oscillated on its fulcrum 40 to swing the rudder in one direction or the other, and the fulcrum 40 is also caused to move bodily or float, so as to prevent any sagging movement of that cable which is not actuated by the expanding bellows. Also, according to application Serial No. 448,506, as soon as the rudder is thus actuated, the tiller lever 39, by means of an arm 41, and a pair of bell crank levers connected by a plain link restores the interceptor valve to a position in which the flow of air between the nozzles is cut off, i. e., it is restored to a stabilised position. All of these parts are symmetrically disposed around a central longitudinal axis 42, and the arrangement constitutes a pneumatic or hydraulic relay to initiate the adjustment of the rudder. It will be hereinafter assumed that the relay is pneumatic.

According to the present invention, however, the means for actuating the rudder from the bellows are modified, and a mechanical follow-up train between the tiller lever and the interceptor shield is substituted for the plain link above referred to.

The mechanism for adjusting the rudder will first be described.

The connections provided between the rudder 21 and the tiller lever 39, are shown drawn to an enlarged scale in Figures 4 to 7, the mechanism being shown in four positions of relative displacement. Mounted on a fixed base 43 and pivoted at 44 is a pair of swinging arms 45 one on each side of the central axis 42, the free end of each arm engaging by means of a knife edge or other bearing with a pressure plate 46, centrally and slidingly carried upon a tension rod 47 which tensions both arms 45 by springs 48 arranged at the respective ends of the tension rod 47. Each spring 48 presses at one end upon the pressure plate 46 and at the other end against the headed end 49 of the tension rod 47. Both of the arms 45 are therefore under constant spring pressure forcing them inwards towards one another, and the arms are connected by toggle links 50 which links are centrally pivoted together at 51, at which point they are also pivoted to one end of a central rod 52 the other end of which impinges upon a cap 53 at the centre of a spiral spring 54 centered on the axis 42. Also pivoted at 51 is one end of a rod 55 whose other end is pivoted to a pair of links 56 pivoted together at 56a which extend outward from each side of the centre axis and have their ends each pivoted to one arm 57 of a bell crank lever fulcrummed on a fixed point 58, the other arm 59 being pivoted to a link or cable 60, 60a, these cables being attached to the respective ends of the tiller lever 39, Figure 1. Extending from the pivot 56a is a link 61, the further end of which is jointed at 62 to the apex of a triangular frame having side members 63, and a base 64, which is pivoted upon a central fixed point 65. The opposite ends of the base 64 are connected by links 66, 66a, to the respective ends of a double armed lever 67 on the fulcrum 68, and on which the rudder 21 is centered. For the sake of clearness the pivots 56a and 65 are shown as slightly spaced apart, but in practice it is preferred that the pivot 56a shall be coincident with, but separate from, 65.

Figure 4:
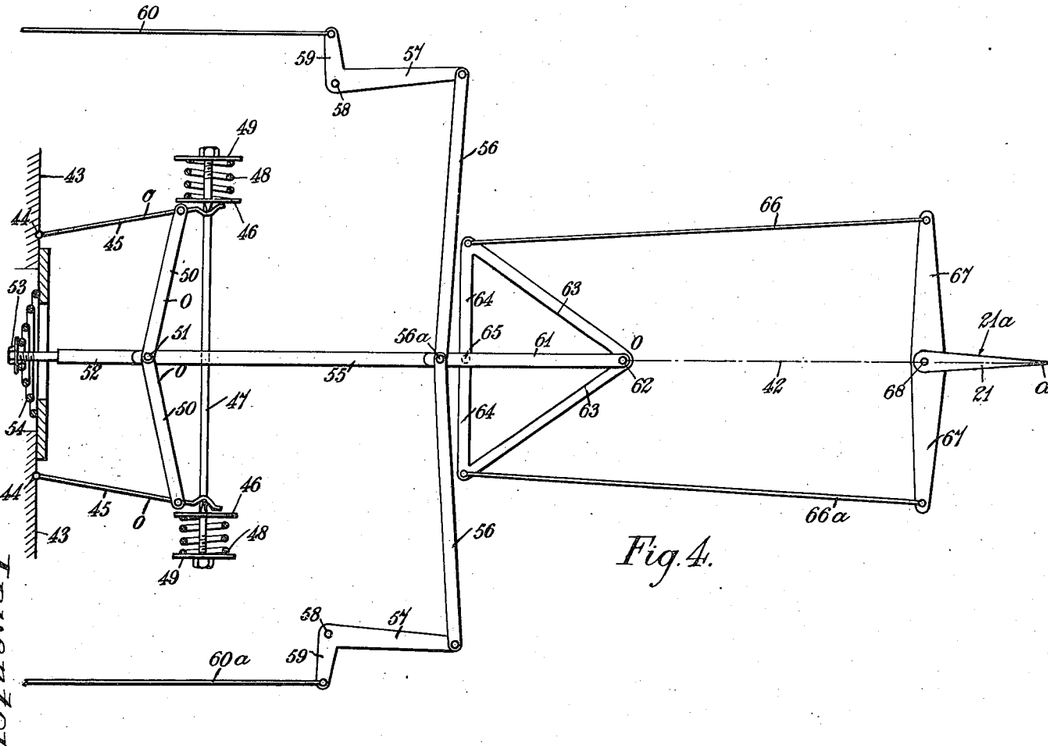
Figures 4 to 7 show in four displaced positions, views of a spring controlled linkage for actuating the rudder.
Figure 5:
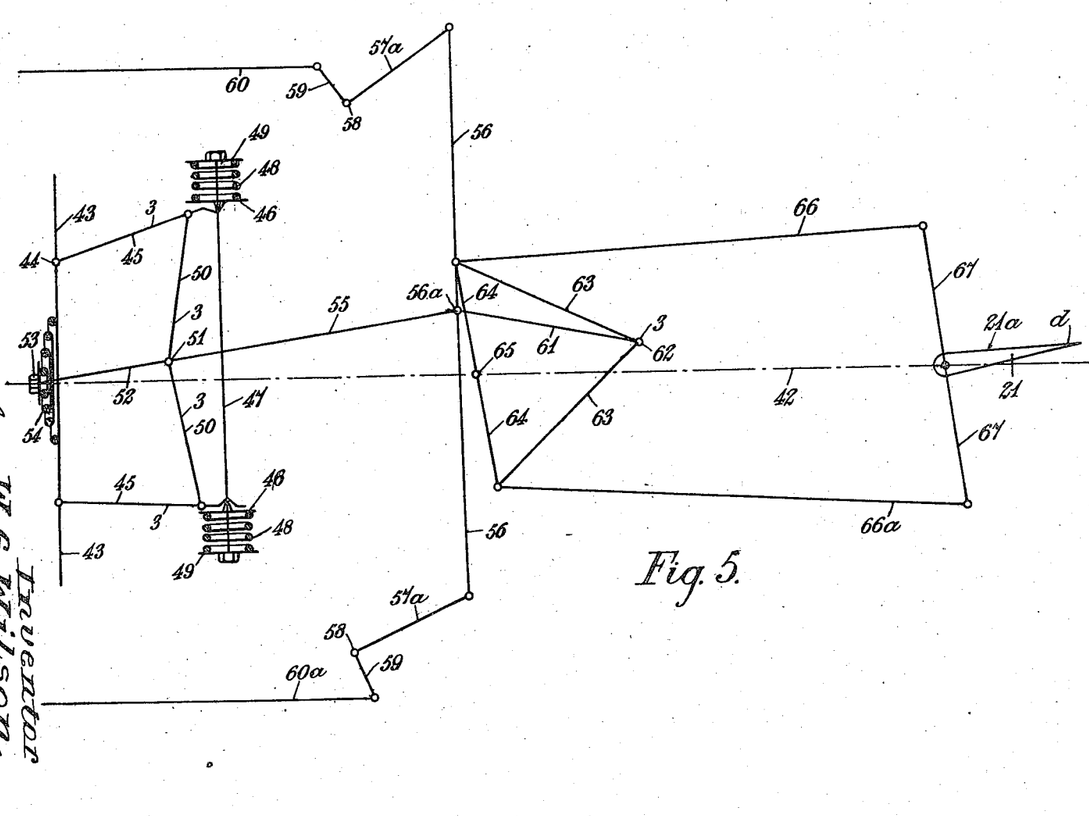
Figure 6:
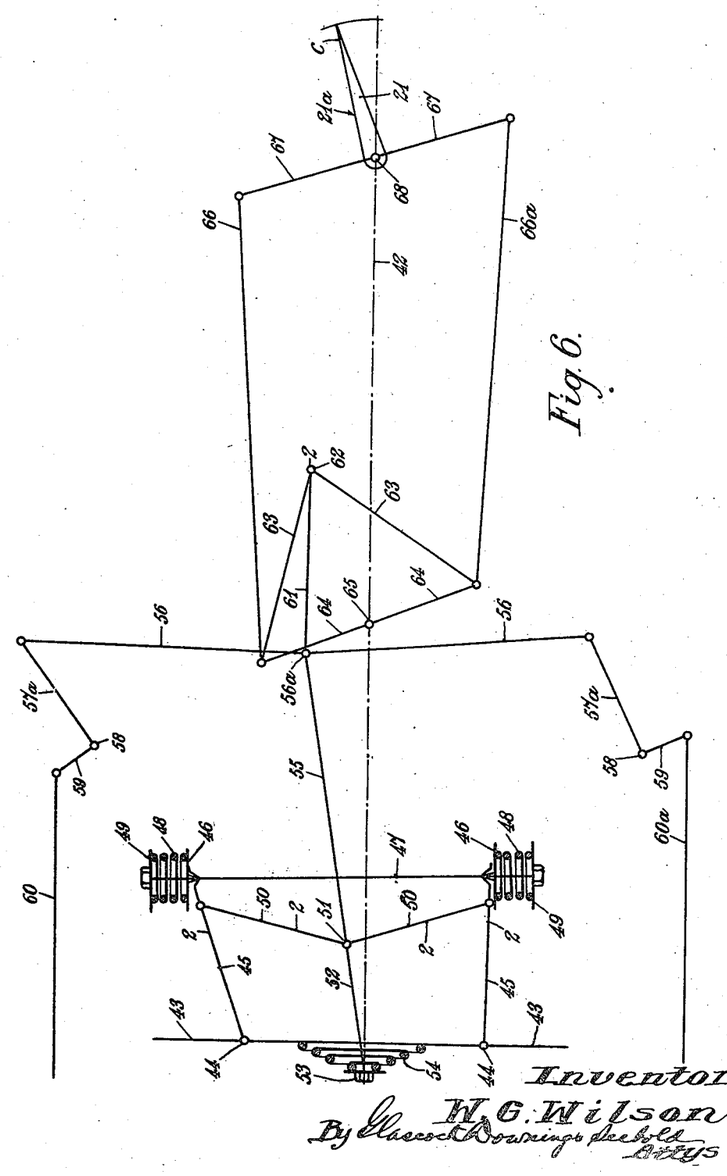
Figure 7:
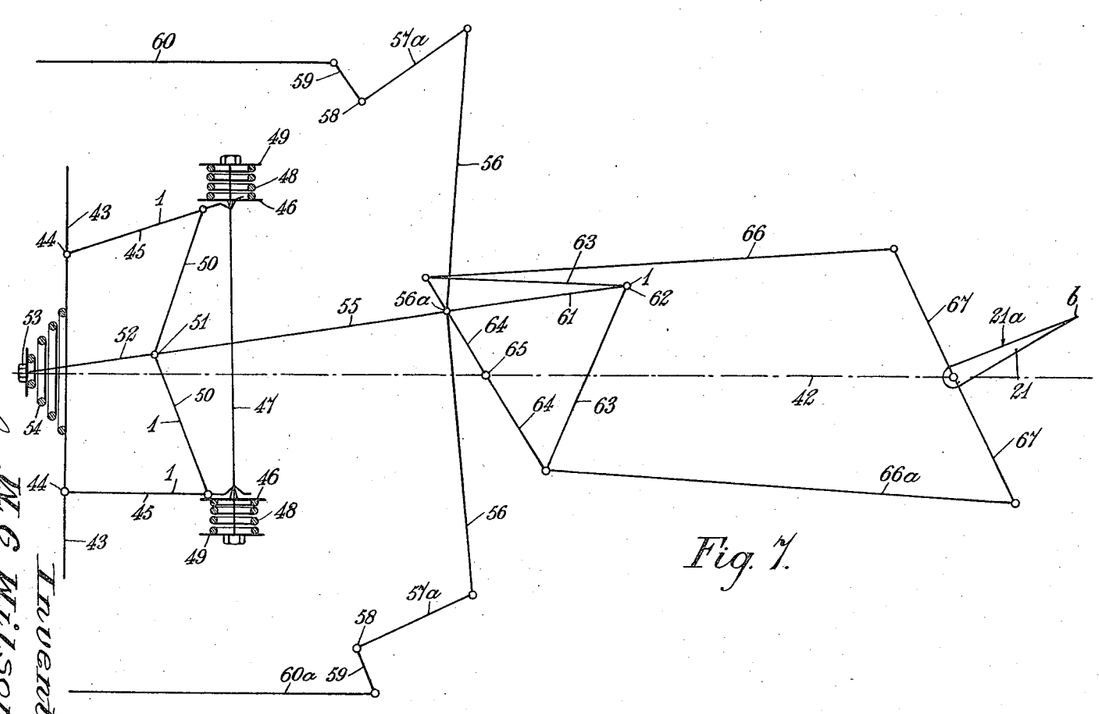

Figure 4 shows the assembly and the rudder in the central or neutral position a and Figures 5, 6 and 7 show the apparatus in three different positions, giving three non-central positions b, c, and d of the rudder.

Assuming that the tiller lever 39 has been swung on its pivot by the bellows, cylinder and piston or the like, and that the upper cable 60 in Figures 4 to 7 has been pulled, so that the bell crank lever arms 57 in Figure 4 are swung into the positions 57a shown in Figure 5, the parts of the assembly are so correspondingly moved that the pivot point 56a is laterally moved to one side of the centre axis 42, the links 45 are swung by a somewhat parallel movement to stress the spiral spring 54 and the springs 48, and the triangular frame is rocked on its pivot 65 so that by the connections 66, 66a, to the double armed lever 67, the rudder 21 is moved from its centre position a. Depending however upon the outside forces that tend to oppose this movement, such as the speed of the vessel or the density of the medium in which it is moving and which are usually concentrated upon the centre of pressure indicated at 21a for example, the rudder will move to such a position that the forces acting upon it from within and from without will become balanced; thus it may assume any of the positions b, c and d, with corresponding displacements of the linkage connections, such as are shown in Figures 5, 6 and 7 and without affecting the amplitude of movement of the bell crank lever arms 57 and 59 which is constant. Such a variable yielding movement of the parts is provided for by the helical springs 48 and the spiral spring 54, which are designed to have a special influence the one on the other.

Figures 8, 9:
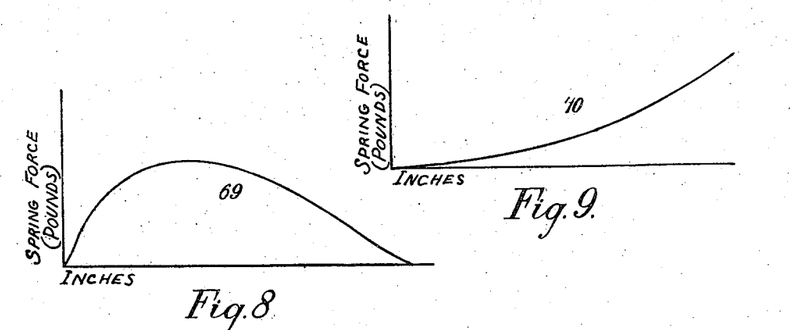
Figures 8, 9 and 10 show three curves illustrating the action of different springs, whereby the characteristics of two of such spring curves (Figures 8 and 9) are superimposed upon one another to produce a characteristic combined curve (Figure 10).
Figure 10:
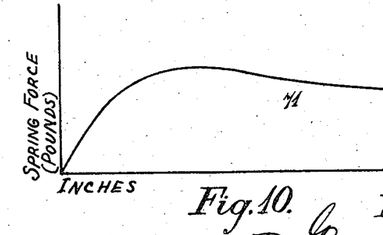

Referring to the curves in Figures 8, 9 and 10, the helical springs 48 at the respective ends of the tension rod 47, have a higher rate or stiffness of spring force as shown by the curve 69, Figure 8, than that of the spiral spring 54, which has a lower rate or stiffness, as shown by the curve 70 in Figure 9. By arranging these springs however in the manner shown in Figures 4 to 7, the effect of one spring is superimposed upon the other to produce the characteristic effect of a spring having a force curve 71, Figure 10. In these figures, the horizontal component of each graph may be travel in inches, and the vertical component may be spring force in pounds, so that as seen in Figure 10, the first portion of the curve 71 has a quick rise corresponding to Figure 8, while the latter part of the curve in Figure 10 partakes of the character of the curve in Figure 9. In this way as the linkage parts are displaced as shown in Figures 4 to 7, so this movement takes place against an increasing and maintained force as shown in the curve 71. By the action of the combined springs 48, 54, the pull on the link 61 due to that of the rod 55, exerts a moment on the double armed lever 64 thereby causing a pull in opposite directions on the rods 66, 66a, by which a deflecting moment is put upon the fulcrum of the rudder 21, and so applying a load transversely of the longitudinal centre axis 42 and thereby exerting a steering influence on the vessel.

By a suitable arrangement of the springs which influence the characteristic spring curve 71, it is possible to make this moment for any predetermined deflection of the bell crank 57, 59, constant for that deflection and independent of the speed of the vessel, the density of the surrounding medium or of the position of the pressure centre 21a. The result of this is that the period of swing of the vessel due to the action of the bellows as controlled by the tiller relay remains substantially a constant. As the velocity or density of the medium surrounding the rudder is increased or decreased so the rods or arms 66, 66a will render due to the movement of the double armed lever 64 without any movement taking place of the control cables or rods 60, 60a. As stated, the moment on the vessel remains constant although the movement of the rudder may have been reduced or increased by the rendering of the rods 66, 66a, as the velocity of the medium acting on the rudder increases or decreases.

Moreover it will be understood, in a case where the fuel is consumed in a self propelled vessel, i. e., an aerial torpedo as described in the specification of my prior United States application Serial No. 448,505, that the moment of inertia of the vessel may be increased or decreased. This may be compensated by so arranging the characteristic of the curve 71 that with higher air velocities the moment exerted by the rudder on the vessel is increased or decreased so as to control the period of the swing of the vessel as desired.

It is to be noted from the arrangement of the toggle levers and the arms and links of the transmission described, that the work on the bellows, pistons or equivalent devices is considerably reduced especially when the rudder has to move through a large angle in comparison with the travel of the cables or rods 60, 60a, which may occur when the vessel is travelling at low speed and when the pressure of air in the bellows is at a minimum. If the pressure of fluid or air on the rudder is such that the angle required brings the links 55 and 61 into a straight line, no effort other than that for overcoming inertia is required on the pull rods or cables 60, but as the pressure of the rudder is increased owing to an increase in velocity or density of the surrounding medium, the pressure of air available for working the bellows is increased and consequently the pull on the cables or rods is increased, although the moment imparted to the vessel is the same in both cases. It should also be noted that unless the rudder goes over further than this point the pull or push on all the rods or levers does not reverse sign, therefore any slackness in the joints does not make for inaccuracy in the functioning of this linkage, i. e., no high precision machining is necessary.

Having thus far described the manner in which the rudder is actuated by an opening movement of the interceptor valve relay through the air nozzles and bellows, the means by which the interceptor valve is restored again to its closed position, will be considered.

Referring now to Figures 1, 12, 13 and 14 when one of the bellows 38 or 38a is expanded due to a displacement of the interceptor valve shield 33, so as to give a considerable amount of rudder, the oscillating movement of the tiller lever 39 through the arm 41 actuates a rod 72, see Figure 1, which by means of a bell crank lever 73, fulcrumed at 74, moves the rod 75 toward the right or to the left depending upon which of the bellows is actuated. The movement to the right or left of the rod 75, after passing through a train of devices, $x$, $x_1$, $x_2$ to be described, acts upon the second bell crank 76 fulcrumed at 77 by which the rod 78 is adjusted to move the fulcrum 30 of the interceptor lever 20 back to the position where the shield 33 is stabilised. The devices $x$, $x_1$, which are in the nature of resilient or yielding mechanism, with which is combined dampening means, such as air beater fans, and/or inertia means, are designed for the purpose of making the movement of the rudder anticipate the restoration of the interceptor valve to its stabilised position, with the flow of air between the jets interrupted.

The device $x$ (which may be seen on an enlarged scale at $y$ in Figure 14), comprises a segmental shaped plate 79, pivoted at 80 at the narrower end, and is made with a curved toothed rack 81, at its wider end, the rack teeth engaging with a toothed pinion 82 mounted on the fixed shaft 83. Carried by the pinion is a circular casing 84, shown in detail in Figure 2 forming part of a fluid damper of a well known kind comprising a number of intercommunicating segmental compartments into and out of which a fluid such as oil is adapted to flow when the casing 84 is rotated by the pinion. The exterior of the casing is fitted with a series of radiating air impact vanes so that the whole device forms a combined air beater fan and/or inertia device. By such a combined device, the characteristic resistance curve of the air beater fan and fluid damper respectively, is modified as shown in Figure 3. In the graph shown in this figure, the horizontal component is velocity in revolutions per minute and the vertical indicates resistance in inch pounds torque. The characteristic curve of the usual fluid damper is shown at 83b which has a quick start, whilst 83c shows the curve of an air beater fan and which has a slow start, and is approximately as the square of the velocity. By combining the two dampening devices however, a new combined curve 83d is obtained which possesses the advantageous features of both curves without their disadvantages, and resulting in a quickly and continuously rising resistance value.

Figure 14:
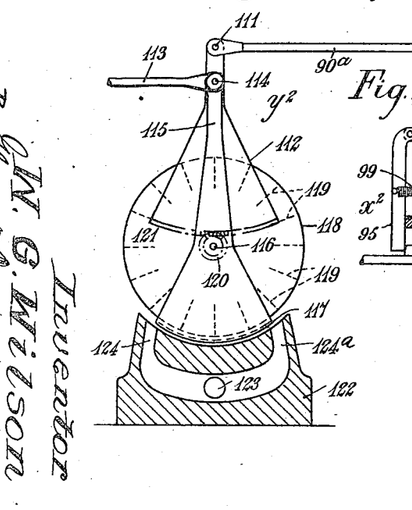
Figure 14 shows a modified transmission train.

The segmental plate 79 carries on the pivot 107, a ⊥-shaped lever 106, to the end 105 of which is pivoted the rod 75, which may be called the incoming rod, the lever 106 being restrained in a normal central position by springs 109 and 109a, one on each side. One end of each spring is secured to the cross member of lever 106 whilst their remote ends are secured to the segmental plate 79. Also pivoted at 108 to the lever 106 is a rod 90, the outgoing rod, which extends in a direction opposite to that of the incoming rod 75.

At the commencement of the curve 83d, Figure 3, springs 109 and 109a are in balance and when rod 75 is moved in relation to segment 79 the tension of one spring is increased and the other reduced, and for small angular movements such as is the case in the present specification, the moment exerted on lever 106 will be practically proportional to the movement of 75 with regard to 79 away from normal.

Due to the action of one of the bellows 38 and 38a the incoming rod 75 is pushed or pulled in one direction or the other, and assuming that it has been pushed to the left, the lever 106 is also swung towards the left round the pivot 107 tensioning the spring 109a. This movement, with a slight retardation due to the stretching of the spring, is directly transmitted to the outgoing rod 90 with a reduced leverage moment represented by the distance between the fulcrum point 107 and the pivot 108 where the outgoing rod is connected. On the first actuation of the incoming rod 75 a proportionately less movement is immediately transmitted to the outgoing rod 90. Due to the effect of the tensioned spring 109a, the segment 79 by rotation on its pivot 80, endeavours to follow the movement of the lever 106, but it can only do so, when the inertia device, the damper and the associated parts have begun to render. Thus before the segment 79 can commence to turn on its pivot 80, the toothed rack and pinion gear have first to overcome the moment of inertia and the damping effect of the combined air fan and/or the fluid damper, by the effect of which the movement of the segment 79 is at first slow but which subsequently increases in speed as the inertia device gets into rotation, then slows down and finally stops due to damping action.

Means may be provided whereby the proportion of movement due to the time lag can be varied by a predetermined setting adjustment, for which purpose the position of the pivot 108 on the lever 106 may be previously set, as by being moved in a slot or into one of a series of holes (shown in dotted lines) at 101, and thus vary its distance from the pivot 107. The greater the distance between the pivots 105 and 108, so the amount of lag in the movement of the outgoing rod due to the springs and the damping action will be proportionately increased.

By such an arrangement therefore a proportion of the incoming movement of rod 75 is immediately transmitted to the outgoing rod, but the segment 79 can only with a time lag follow up this movement, such lag being determined by the period of the inertia and damping device, and which period is so determined and selected that it shall be appropriate for the period of swing selected for the steering of the craft. It is to be understood that either the air fan or the fluid damper may be used alone or they may be combined, and that a dashpot device may be used if preferred.

From the foregoing description the actuation of the incoming rod 75 results in two movements being given to the outgoing rod. The first is a direct and immediate reduced movement through the lever 106 on its pivot 107 and thence through the connection 108 to the outgoing rod 90; and the second movement in the same direction as the first which is given by the rendering action of the inertia damping device, and associated parts.

From the device $x$ the movements of the rod 90 are transmitted to the next device $x_1$, and after actuating a spring centralising device $x_2$ they pass to the rod 78 where they act upon and restore the interceptor valve 33, Figure 1, to its stabilised position. The devices $x_1$, $x_2$ are shown on an enlarged scale in Figure 12. In the device $x_1$, the incoming rod 90 is connected to a segmental plate 91 pivoted on a fixed point 92. Similarly to Figure 1, the wider end of the segment has a rack and pinion connection 81, 82 with a damping device which may be similar to that already described consisting of an air beater fan and/or fluid damper. In this case the pinion 82 is mounted on the end of an arm 93 pivoted at 92, while to the arm 93, between its pivot 92 and pinion 82, is connected the outgoing rod 94. The pinion 82 is thus adapted to roll around the rack 81 with the moving arm 93. No springs are used in this device and when a linear movement to the left is given to the rod 90 from the device $x$, the movement of the toothed pinion being retarded by the action of the air beater fan, causes the whole device to swing bodily round the pivot 92, so that a direct movement is given to the outgoing rod 94. From the device $x_1$ the movement is transmitted to the spring centralising device $x_2$ which comprises a pair of arms 95, 95a, pivoted together at 96 so that they form an open ended fork, between the jaws of which is a fixed zero stop 97 and a finger 98 on the rod 94. The arms 95, 95a are normally drawn towards one another and against the stop 97 by a lateral spring 99, the arrangement being such that the arm 93 will have a tendency to be always drawn or pushed back to a central position after it has been moved in one or the other direction.

The combined action of the train of devices $x$, $x_1$ and $x_2$ is as follows:

With the interceptor lever and valve in the central position shown in which there is an equal but retarded flow of air through the two sets of receiver and supply nozzles keeping the bellows equally although not fully expanded, it will be assumed that the vessel has a drifting movement to starboard in the direction of the arrow 100, Figure 1. Such drifting movement by the action of the gyroscope will move the intercepting valve shield 33 in a clockwise direction and cause a full supply of air to pass from nozzle 34a to 35a through the duct 37a and actuate the bellows 38a. The passage of air, however, between the other nozzles 34 and 35 is completely interrupted by this movement of the intercepting valve, and the bellows 38 is allowed to slowly collapse by a back-flow of air through the duct 37 which exhausts by the nozzle 35. When by the expanding movement of the bellows 38a the tiller lever is rocked, a pull is exerted on cable 60a by which, through the linkage mechanism already described, the rudder will be moved to port. Simultaneously with this movement of the tiller lever, its centre arm 41 will exert a pull on the rod 72 in the direction of the arrow 101 and through the bell crank lever 73, will move the incoming rod 75 in the direction of the arrow 102 to actuate the first delay action device $x$, see Figure 1. The movement of the arm 41 on the tiller lever 39 to restore the intercepting valve is transmitted to the device $x$ and by the lever 106 is immediately passed on to the second device $x_1$ and through the rod 94 acted on by the centralising members $x_2$, to the intercepting valve to stabilise the lever 20 and so check further action of the rudder. This action is simultaneous with the rudder movement. Then by the rendering action of the inertia damping mechanism 84 and associated parts on the device $x$, a further increment of movement is passed on and subsequently moves the interceptor valve, and should the rate of deflection of the craft be greater than the rate of rendering, then more rudder will be put on by increase of pressure on the bellows 38a; but should the rate of deflection of the craft be less than the rate of rendering, the pressure on the bellows 38a as well as the rudder movement, will be reduced.

These conditions will be repeated in consonance with the periodic changes from side to side of the sinuous curve of the track line, until the craft is steadied on its course. On each successive swing the rudder will anticipate the further deflection of the craft and so reduce the amplitude of swing, until the craft is once more on its course.

It may be explained that when the interceptor valve is centred between the two sets of nozzles, the opposite edges of the shield 33 will lie on a centre line between each set of nozzles, so that there will be a retarded flow of air from each supply nozzle to its associated receiver nozzle so that both bellows are equally and partly expanded. When therefore the rate of deflection of the craft is less than the rate of rendering or vice versa, the interceptor valve is not centralised exactly between the two sets of nozzles, the bellows 38a in the example being described receives a greater or lesser charge of air as the case may be and regulates accordingly the amount of rudder.

Whilst such a control is however being exercised, another factor is introduced by the action of the one-way rendering device $x_1$, and the centralising means $x_2$ by the effect of which the interceptor valve is stabilised short of its centre position so that air is still supplied to the particular bellows concerned to maintain the rudder. Each time that port rudder, for example, is demanded by the gyroscope the spring pressure of the finger 95 causes a small amount of rendering of the damped member 84 of the device $x_1$, thereby reducing the length of the transmission $x$, $x_1$, $x_2$, so that when the interceptor valve is in the stabilised position a certain amount of port rudder will remain on permanently, i. e., during the particular swing of the craft. The converse will of course occur when starboard rudder is called for. The application of permanent rudder must be very slow in relation to the rudder called for by the gyroscope.

Instead of using the devices $x$ and $x_1$, two of the former may be used as shown in Figure 14 and indicated at $y$ and $y_1$ respectively. They may have different periods and by thus using two, more effective control may be obtained. In place of the device $x$, Figure 1, or $y$, Figure 14, the modified device shown in Figure 11 may be used. This consists of a segmental shaped plate 79, pivoted at 80 at the narrower end and is made with a curved toothed rack 81 at its wider end, the rack teeth engaging with a toothed pinion 82 mounted on the fixed shaft 83. Carried by the pinion is a circular casing 84, shown in detail in Figure 2, forming part of a fluid damper as already described.

Figure 11:
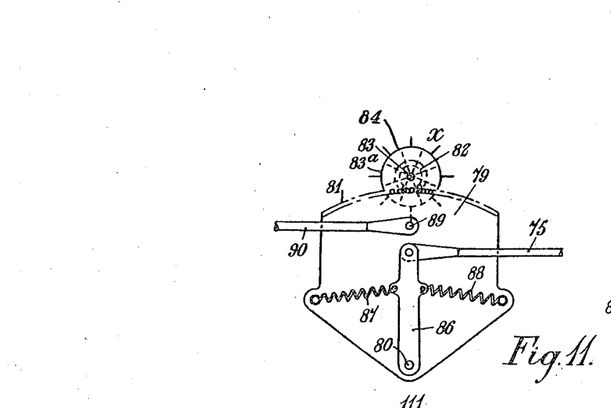

The segmental plate 79 carries on the pivot 80 a lever 86, to the end of which is pivoted the incoming rod 75, the lever 86 being restrained in a normal central position by springs 87 and 88 one on each side. The adjacent ends of the springs are secured to the lever 86 whilst their remote ends are secured to the segmental plate 79. Also pivoted at 89 to the plate 79 is a rod 90, the outgoing rod, which extends in a direction opposite to that of the incoming rod 75. The use of the device shown in this figure ensures that an increased movement will be imparted to the outgoing rod 90 as against the reduced movement given to 90 or 90a by the device $y$ or $y_1$.

Instead of using the device $x_1$, Figure 1, the gearing mechanism shown in Figure 13 may be used. The toothed segment 91 and lever arm 93 are used as in Figure 1, and these are connected to the incoming rod 90 and the outgoing rod 94 respectively. The upper end of the lever 93, which is free to oscillate from side to side on the pivotal support 92 at its other end, carries on the spindle 83 a pinion 82 which is attached to a large gear wheel 83e and the latter is in mesh with a pinion 83f on the spindle 92 which forms the pivotal support for the whole device. Such pinion 83f is arranged to drive an air beater fan and/or fluid damper as before. By the train of gearing thus formed and the high speed which tends to be given to the gear wheel 83e and the pinion 83f, the damper movement is slow under the influence of the spring finger 95 but is not affected appreciably by the movements of 90 and 94.

Instead of the devices $x_1$, $x_2$ above described, the device $y_2$ in the train of devices $y$, $y_1$, $y_2$, Figure 14, may be used. This constitutes a means acting in conjunction with a secondary relay, whereby the movement it receives from the outgoing rod 90a of the previous device $y_1$ is transmitted substantially without any lag to stabilise the interceptor valve 33 this being followed by a relatively slow reverse movement for the purpose hereinafter described. For this purpose the rod 90a is pivoted at 111 to a segmental lever 112 and the outgoing rod 113, which actuates the interceptor valve 33 of the tiller relay, is also pivoted at 114 to the segmental lever 112 at a position close below the pivot 111. Attached also by the pivot 114 to the segment 112 is a two armed lever 115, lying in front of the segment 112 and being fulcrummed on a shaft 116, its lower end being of arcuate form and bent laterally under the drum to form a valve plate 117 in a manner similar to that of the interceptor valve shield 33 of the tiller relay. On the shaft 116 is mounted a rotary impeller drum 118 formed with a series of radial vanes or blades 119. Freely mounted on the shaft 116, and secured to the side of the drum 117, is a toothed pinion 120 engaging with an arcuate toothed rack 121 on one end of the segmental lever 112, and arranged beneath the impeller drum is a hollow casing 122 to the internal space of which is led a supply of compressed air or other pressure fluid by an inlet duct 123 that may be branched off the pipe 36, Figure 1, which supplies the bellows. The pressure fluid supplied through the inlet 123, issues from the casing 122 through a pair of nozzles 124 and 124a which are symmetrically arranged respectively on each side of and beneath the axis of the impeller drum and impinges upon the blades 119 of the drum. The arcuate valve plate 117 which is also symmetrically arranged in the normal position shown, has its ends equally overlapping a part of each nozzle 124, 124a, so as to leave a space through which the pressure fluid, preferably compressed air, can pass out and impinge with equal force on the blades 119 at both sides of the axis of the impeller drum. The arrangement thus forms a pneumatic or other pressure relay which in the position of the parts shown in the figure is nonoperative, but it may be pointed out that the impeller drum forms also an air beater fan, due to the movement of those vanes or blades which are not being immediately acted upon by the compressed air. Moreover, if desired a fluid damper may be used.

It is to be understood that during a flight the rods 90, 90a and 113 will be moving backward and forward periodically due to the sinuous course line. Thus when the incoming rod 90a moves in a linear direction for example, to the left, which results from the rudder having been adjusted to give port rudder, the movement is imparted directly without appreciable lag, to the outgoing rod 113, and stabilises the interceptor valve. By the same movement of the rod 90a, the lever 115 is swung bodily around the shaft 116 and moves the curved valve plate 117 to the right intercepting the flow of air through the nozzle 124a, and opening the nozzle 124, so that the impeller drum 118 is now set into rotation in a clockwise direction. The rotation of the drum rocks the segmental lever 112 about its pivot 114 in an anticlockwise direction and owing to the pivot 111 being above the pivot 114 a differential movement is obtained which is equivalent to shortening the attachment of 90a to the rod 113, thereby putting on permanent port rudder. The effect of this permanent rudder will tend to straighten out the craft on its original course, but not on the same line but on a line parallel thereto. The leverage ratio of the parts is preferably such that this shortening movement is slow in relation to the previous actuation of the outgoing rod to the left.

Figures 12, 15:
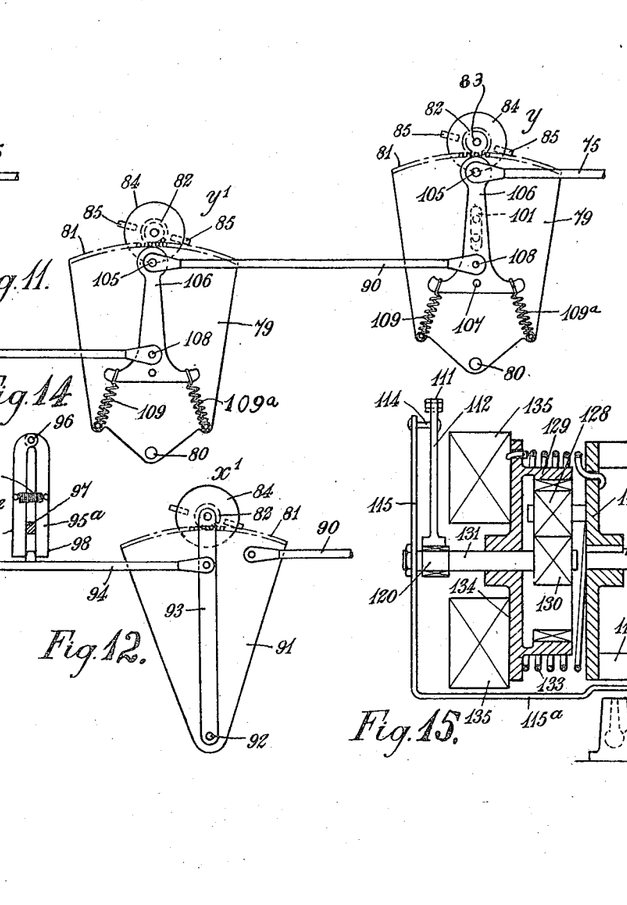

In the modification shown in Figure 15, which is a modified elevation at a right angle to the device $y_2$, Figure 14, the said device is supplemented by an epicyclic mechanism. The segmental lever 112, connected at 111 to the incoming rod 90a (not shown), the two armed lever 115 and pinion 120, remain as before and are positioned at one end of the epicyclic device, but the impeller drum 118 and the arcuate valve 117, and the associated pneumatic casing 122 are arranged at the other side, the lever arm 115 being extended laterally at 115a to carry the arcuate valve 117.

The impeller drum is adapted to carry a set of planet pinions 128 which are each engaged on one side with an internally toothed annulus 129 and on the other side with a centre pinion 130 mounted on a shaft 131, the other end of which carries the pinion 120 which is in mesh, as before, with the toothed segment 112. The impeller drum 118 which carries the vanes 119 is connected by means of a spring 133 to the disc 134 which forms part of the annulus 129. On the back of the disc 134 are fixed a number of vanes 135 to form an air fan beater device and/or a fluid damper.

The action of this epicyclic rendering device is similar to that of $y_2$, so that by a linear movement of the incoming rod 90a, the outgoing rod 113 connected to the segmental lever 112 is directly moved as before, and the lever 115 is swung bodily to actuate the arcuate valve 117. The impeller drum is now rotated to carry round the planet pinions 128, and at the same time tension the spring 133. By this movement the pinion 130 is rotated to drive the pinion 120 so as to draw back the outgoing rod 133 as before, and the annulus 129 is rotated by the overspeed drive to rotate the disc 134 against the resistance of the damping and/or inertia device 135. Owing to the resistance offered by the latter the movement of the pinion 120 is increased and by the segment 112 draws back the outgoing rod 90 and stabilises the interceptor valve 33, as before. Subsequently, the unwinding action of the spring tends to restore the normal alignment of 118 and 134.

In any of the anticipating devices hereinbefore mentioned the degree of anticipation is governed by two factors:

(a) The anticipation due to the velocity of the incoming movement is governed by the degree of damping, whether by fluid or air, or both, of the rotary damper element.

(b) The degree of anticipation due to the rate of change of velocity of the incoming movement is governed by the moment of inertia of the rotary damper element.

Figure 16:
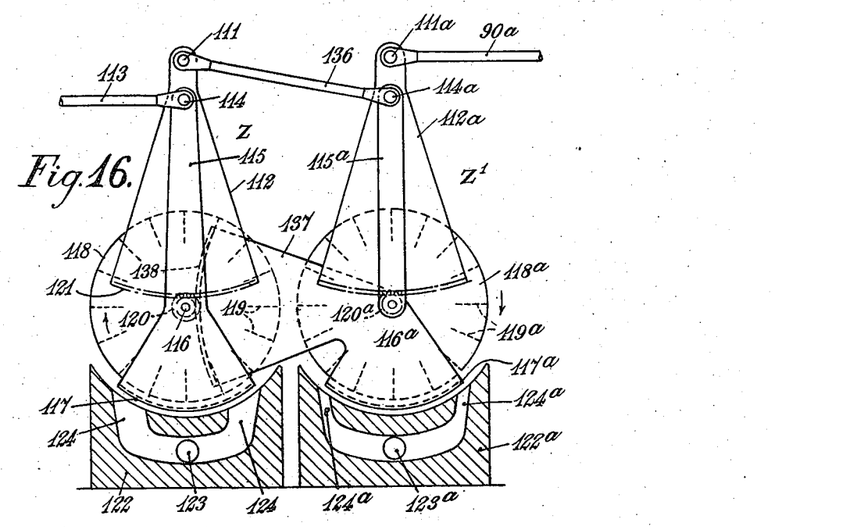

As previously stated, by the rendering device $y_2$, Figure 14, the vessel is steered back to its course, although not on its original line, but a modification shown in Figure 16 of the device $y_2$ will provide means by which the vessel is brought back to its original course line.

The modified arrangement for this purpose comprises a pair of devices $z$, $z_1$, constituting a compound relay which are both somewhat similar to $y_2$ in Figure 14, and the parts of $z$ which are similar to $y_2$ are lettered the same as in Figure 14, whilst to the similar parts of $z_1$ the index "a" is added.

The incoming rod 90a is pivoted at 111a to the segmental lever 112a of the device $z_1$ and the lever 115a at one end is pivoted at 114a to one end of a link 136, the other end of the link being pivoted at 111 to the segmental lever 112 of the device $z$.

The shaft 116a freely carries a second arcuate valve 117a similar to that of $z$ but the valve member is provided with a lateral segmental extension 137 having a toothed rack 138 which engages with the pinion 120 carried on the shaft 116 of the device $z$. The other end of the lever 115a is loosely pivoted on the shaft 116a.

The second arcuate valve 117a is adapted to co-act with nozzles 124a by which compressed air or other fluid from the casing 122a acts upon the blades 119a of the impeller drum 118.

The operation of the apparatus is as follows:
Assuming that the incoming rod 90a is moved to the left, the segment 112a and the lever 115a pivot idly round the pinion 120a and the shaft 116a respectively, and has no appreciable effect upon the device $z_1$. The movement of the rod 90a is however transmitted by the link 136 to the device $z$ and directly onward to the outgoing rod 113, and at the same time swings the lever 115 bodily in an anti-clockwise direction around the shaft 116, opening the arcuate valve 117 as before, by which the impeller drum 118 is set into rotation in a clockwise direction and by the rotation of the pinion 120, swings the toothed rack 138 downwards and the second arcuate valve 117a to the right, so that the impeller drum 118a is also set into rotation in a clockwise direction. During these movements the segment 112 is swung to the right shortening the relative position of 136 and 113 as already described, but when the second impeller drum 118a is set into rotation, the segment 112a by the pinion 120a and oscillating round the fulcrum 114a again shortens the relative length of the connection 90a to 136.

Figures 17, 18, 19:
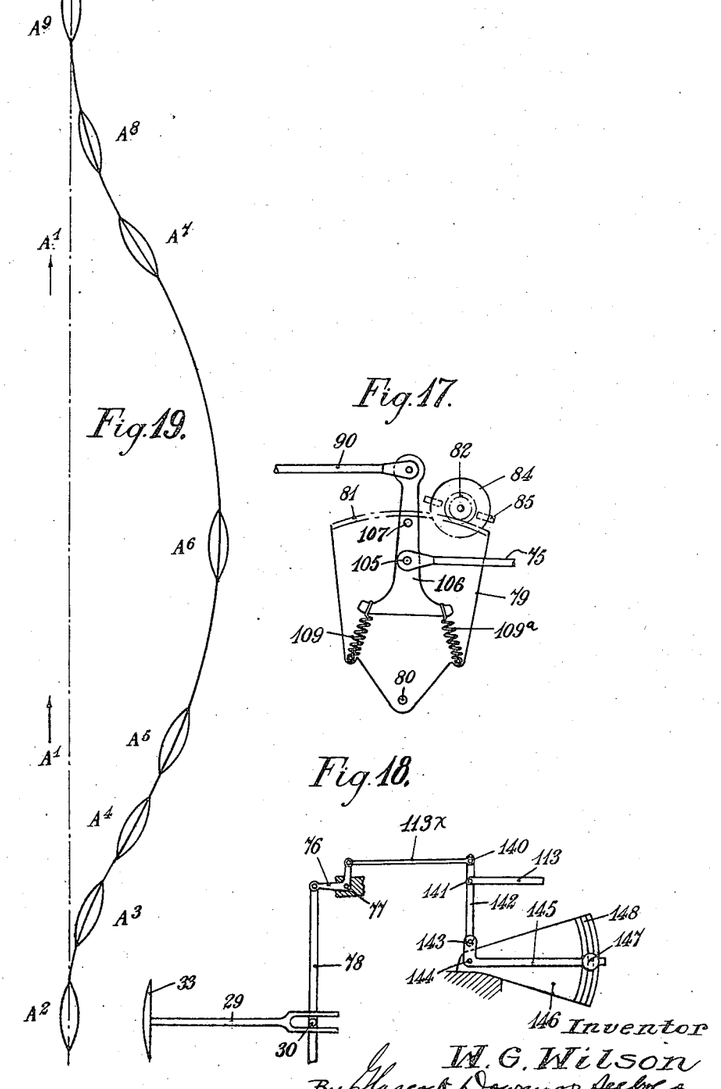

As long as port rudder is applied, the drum 118 will be rotated in a clockwise direction, but when starboard rudder is applied the reverse takes place, and it rotates in an anti-clockwise direction, but the valve 117a will be restored to its central position only when the total amount of starboard rudder has equalled the total amount of port rudder. Permanent rudder has however been applied by both these devices and stability will be reached when the permanent rudder due to the device $z$ has been removed, the permanent rudder due to $z_1$ is applied and the total starboard rudder equals the total port rudder that has been applied. By this method the vessel is brought back not only to its own course, but also to the original track line, as shown in Figure 19. It must be understood that this figure shows the commencement and rectification of a complete deviation on the track line, the sinuous curve which the craft actually follows being however omitted.

It may be noted that both sets of nozzles 124 and 124a are of elongated form following the curve of the impeller drum, and either made as a single slot, or a line of small apertures, and further that the nozzles 124 are longer than 124a. The object of this is to ensure that there will be a free flow of compressed air through 124 whether the torpedo or other craft is moving fast or slow, i. e., they will respond efficiently to changes in speed conditions. The amount of opening of 124 should be proportional to the movement of link 136, but the nozzles 124a should only be sufficient to impart a predetermined maximum speed to the associated impeller drum. The outgoing rod 113 has a very small movement in moving the arcuate valve 117 and the resulting movement subsequently causes the movement of the tiller which in turn gives the movement to the incoming rod 90a.

In the case when the compound relay above described, Figure 16, is used in train with the devices $y$, $y_1$, Figure 14, in the manner in which, after a vessel has been deviated off its course, it is brought back to its proper course line, is illustrated in Figure 19.

Assuming that the vessel A should be following the course line $A^1$—$A^1$, but by reason of a displacing force at $A^2$ it commences to deviate, the tiller relay is brought into action. At about the position $A^3$ the first relay $z$ is opened and the tiller relay is closing. At $A^4$ the first relay $z$ commences to give permanent helm, and the second relay $z_1$ also applying permanent helm opens, and at $A^5$ both are inducing permanent helm. The original deviation is now under control and the vessel is beginning to swing on to a course which will be parallel to the proper line $A^1$. By the time the vessel reaches $A^6$ the vessel is on its course but not on the original line, and the first relay $z$ is closed, but the second relay $z_1$ is still in operation, because permanent helm from the first relay is still active. From the position $A^6$ to $A^7$, the first relay permanent helm is being reduced and permanent helm is increasing by the second relay, and when $A^8$ is reached opposite helm is applied through the first relay and the second relay is nearly back in its zero position, and the vessel is now nearly back to its proper course line. At $A^9$ the first relay is at zero and the second relay is correct for the further progress of the vessel along its course line $A^1$.

A modification is illustrated in Figure 17, of either of the devices $y$, $y_1$, Figure 14. The mechanism is very similar to that in $y$ or $y_1$, and similar parts have the same reference letters, and it will be seen that instead of attaching the outgoing rod 90 to the ⊥-shaped arm 106 between the fulcrum 107 and the pivotal connection at 105 to the incoming rod 75, the ⊥-shaped lever is extended beyond the fulcrum 107 and the outgoing rod 90 is secured at 108 to such extended end. When therefore a linear movement of the incoming rod 75 occurs to the left for example the lower end of the lever 106 is swung to the left around the fulcrum 107 so that a free and extended movement towards the right is given to the outgoing rod 90 and tensioning the corresponding spring 109a to cause the follow-up movement of the segment 79. As the segment 79 overcomes the moment of inertia of the dampening device 84, as well as the dampening effect, the rendering action causes a movement of the fulcrum 107 towards the left, the lever 106 turning about the pivot 105 so that the outgoing rod 90 is moved in the reverse direction i. e. to the left.

In order that the interceptor valve shield 33, Figure 1 and the similar arcuate valves 117, 117a in Figures 14 and 16 will, during normal operation, both assume their central non-operative positions accurately when the vessel is on its course and either simultaneously or one after the other, a fine adjustment may be used as shown in Figure 18. For this purpose, the rod 113x leading to the interceptor valve shield 33, and the outgoing rod 113 from either of the devices $y_2$, Figures 14 and 16, are pivoted at 140 and 141 to one end of a link 142, the other end of which is pivoted at 143 to one arm of a bell crank lever fulcrumed at 144. The other arm 145 is movable over a fixed quadrant 146 and fitted with a clamping screw 147 which may be tightened in any position in a slot 148 to which the bellcrank arm 145 may have been adjusted. The pivots 140 and 141 act as alternative floating fulcrum points depending upon the amount of adjustment required for either or both of the rods 113x or 113 to centralise the valves associated therewith.

By the use of the various devices according to the invention, all deviations of the vessel off its course are under automatic control and the successive swinging movements of the vessel whilst it is being brought back to its course are smoothed out without there being any appreciable "hunting" if any, and the rudder movements are designed to anticipate further deflection of the craft.

The invention may also be applied to control the fore and aft pitching movement of a projectile for example, and in that case an additional set of bellows and mechanism associated therewith would be employed. Means may also be employed to control the movement of a projectile when it attains the peak of its trajectory and guide it downward, or when as with a submarine the direction has to be changed after a certain distance has been followed. For this purpose either a slip stream device may be used or the clamping screw 147 may be adjusted, Figure 18. When the latter is to be used on a projectile, the clamping screw may be adjusted by radio transmission.

I claim:

1. In an automatic mechanism for checking and rectifying any deviation off-course of air-borne craft or other vessels or projectiles such as for example aerial torpedoes, the combination of a pivoted rudder, a pivoted tiller lever for operating the rudder, a pair of servo-motors to swing the tiller lever on its pivot one way or the other and thus actuate the rudder, means for supplying pressure fluid to the servo-motors, a gyroscope controlled interceptor valve normally occupying a stabilized position and operable to interrupt the air supply to one of the servo-motors and admit air supply to the other when a deviation occurs, and a mechanical follow-up mechanism forming a delay action train extended between the tiller lever and the interceptor valve to stabilize the valve after it has been initially operated to pass air to one of the servo-motors by a commencing deviation to adjust the helm and correct such deviation, said follow-up mechanism including a movement damping element, an inertia element operatively connected and combined with the damping element, incoming and outgoing transmission members connected to the tiller lever and interceptor valve respectively, and means connecting the transmission members to the combined inertia and damping elements so that they resiliently cooperate.

2. Automatic mechanism for rectifying any deviation off-course of air-borne craft or other vessels, comprising the combination of a rudder, a tiller lever for operating the rudder, a pair of servo-motors for actuating the tiller lever, an air pressure duct for each servo-motor, a gyroscope-operated interceptor valve normally occupying a stabilized position and operable to selectively control passage of air pressure to the servo-motors, a mechanical retarding follow-up train between the interceptor valve and the tiller lever to stabilize the valve after it has been initially actuated to pass air pressure to one of the servo-motors, and yielding operating means between the tiller lever and the rudder whereby the rudder is actuated to such an extent as will afford an automatic balance between the forces imparted to the rudder from the tiller lever and those which exist externally of the rudder.

3. In automatic mechanism of the kind indicated, and having a rudder, air actuated means for moving the rudder, and an interceptor valve for controlling the admission of air to said air actuated means, the combination of a mechanical follow-up mechanism between the rudder moving means and the interceptor valve, said mechanism including a pair of pivoted levers, springs operatively connecting together said levers, a rotary damper and inertia device, gearing connecting the rotary device with one of the levers, an incoming transmission rod from the rudder actuating means connected to the other lever, and an outgoing transmission rod connected at one end to the first mentioned lever and at its opposite end to said valve, said mechanism forming a delay action train.

4. In automatic mechanism of the kind indicated, and having a rudder, a tiller lever for operating the rudder, air-actuated means for moving the tiller lever, an interceptor valve for controlling the admission of air to the air-actuated means, the combination of a mechanical delay action train between the rudder and interceptor valve, said train including resiliently connected inertia and damping devices, a one-way rendering device, a spring pressed centralizing device, and pull and push rods, the several devices and rods being arranged and connected in series between the valve and tiller lever, whereby the interceptor valve is first closed after a delayed action, after which by the rendering action of the resiliently connected devices in the train, a further movement is given to the valve to re-open it.

5. In automatic mechanism of the kind indicated, and having a rudder, a tiller lever for operating the rudder, air actuated means for moving the tiller lever, an interceptor valve for controlling the admission of air to the air-actuated means, the combination of a delay action transmission between the tiller lever and the interceptor valve, said transmission including a one-way rendering device, a spring pressed centralizing device, and pull and push rods, said devices and rods being connected in series to form part of mechanical delay action transmission, and means whereby the centralizing and one-way rendering devices so mutually interact that the length of the mechanical train is varied depending upon the swing of the craft steered by said rudder.

6. Automatic mechanism for rectifying any deviation off-course of air-borne craft or other vessels comprising the combination of a rudder, a tiller lever for operating the rudder, a pair of servo-motors for actuating the tiller lever, an air pressure duct for each servo-motor, a gyroscope operated interceptor valve normally occupying a stabilized position and operable to selectively control passage of air to the servo-motors, and a mechanical follow-up train between the tiller lever and interceptor valve, said train including two sets of series connected yielding means, a relay, an incoming rod from the tiller lever connected to one set of yielding means, an outgoing rod from the other set of yielding means connected to the relay, and a link connecting the relay to the interceptor valve, whereby the movement of the tiller lever by one of the servo-motors is first transmitted directly through the yielding means, rods, relay and link to the interceptor valve to stabilize it, after which by the rendering action of the two sets of yielding means a further movement is imparted to the interceptor valve by the relay to vary the length of the mechanical train and give a degree of permanent rudder to bring the craft on to its course but not on the original course line.

7. In automatic mechanism of the kind indicated and having a rudder, a tiller lever for operating the rudder, air actuated means for moving the tiller lever, an interceptor valve for controlling the admission of air to the air actuated means, the combination of a delay action transmission between the tiller lever and the interceptor valve, said transmission including two sets of yielding means, an incoming rod from the tiller lever connected to one set of yielding means, means for series connecting the two sets of yieldable means, a pair of relays, means for connecting and gearing together both relays, a link connecting one relay to one set of the yielding means, and an outgoing rod connecting the other relay to the interceptor valve, said transmission forming a mechanical train, by which the rudder is so controlled that the craft is brought back to its original course line after a deviation therefrom.

8. In automatic mechanism of the kind indicated and having a rudder, a tiller lever for operating the rudder, air-actuated means for moving the tiller lever, an interceptor valve for controlling the admission of air to the air-actuated means, the combination of a delay action transmission between the tiller lever and the interceptor valve, said transmission including a segment-shaped lever having teeth on its larger end and pivoted on a fixed point at its smaller end, a lever arm also pivoted on said fixed point, springs each connected at one end to the lever arm and connected at their other ends to the segment shaped lever, an ingoing actuating rod connecting the tiller lever to the free end of the lever arm, an outgoing rod extending to the interceptor valve and connected to the segment-shaped lever, an air beater fan, a fluid damper, a fixed shaft on which the fan and fluid damper are respectively mounted, and a pinion on the shaft in mesh with the teeth of the segment-shaped lever so that the movement of the ingoing rod is transmitted to the outgoing rod only after the resistance of the air fan, fluid damper and springs is overcome.

9. In automatic mechanism of the kind indicated and having a rudder, a tiller lever for operating the rudder, air-actuated means for moving the tiller lever, an interceptor valve for controlling the admission of air to the air-actuated means, the combination of a movement-retarding mechanism, an incoming rod connecting said mechanism to the tiller lever, a one-way rendering device consisting of a segmental lever having teeth on its larger end and pivoted on a fixed point at its smaller end, a lever arm also pivoted at one end on said fixed point, a shaft on the opposite extremity of the lever arm, a toothed pinion on the said shaft in mesh with the teeth on the segmental lever, a rotary air beating fan carried on said shaft, a fluid damper carried on the shaft, a link connecting the segmental lever to the retarding mechanism, and an outgoing rod from the lever arm to the interceptor valve, said retarding mechanism and rendering device forming a mechanical train such that whether the incoming rod is pulled or pushed, both the segmental lever and the arm will first be moved substantially in unison with the incoming rod driving the outgoing rod in the same direction after which the device renders by means of the damper and fan to shorten or lengthen the mechanical train.

10. In automatic mechanism of the kind indicated and having a rudder, a tiller lever for operating the rudder, air-actuated means for moving the tiller lever, an interceptor valve for controlling the admission of air to the air-actuated means, the combination of a delay action transmission, said transmission including a movement retarding mechanism and an incoming rod from the tiller lever to said mechanism, a one-way rendering device connected in series with the retarding mechanism, an outgoing rod extending from the one-way device to the interceptor valve, a finger on said outgoing rod, a pair of arms engaging the finger and pivoted together at a fixed point, a fixed zero center stop between the arms and spring means normally drawing the arms towards each other and against the stop, whereby after the outgoing rod has been moved in one direction or the other against the action of the spring drawn arms, said arms, tending to return to the zero position, will cause the one-way device to render.

11. In an automatic mechanism of the kind indicated and having a rudder, a tiller lever for operating the rudder, air-actuated means for moving the tiller lever, an interceptor valve for controlling the admission of air to the air-actuated means, the combination of a delay action transmission between the tiller lever and the interceptor valve, said transmission including a segmental lever having teeth on its larger end and pivoted on a fixed point at its smaller end, a shaft adjacent the toothed larger end, a pinion on said shaft in mesh with the teeth on the segmental lever, a fluid damper device on said shaft, an air beater fan mounted on the shaft, a T-shaped lever fulcrumed at its lower end on the segmental lever, a spring extending in opposite directions from each side of the T-shaped lever to the segmental lever, an incoming actuating rod connecting the free end of the T-shaped lever with the tiller lever and an outgoing rod connecting said T-shaped lever at a point between its fulcrum and its free end with said valve, said outgoing rod receiving a direct transmitting movement and, when the device renders by the action of the air fan, the outgoing rod receiving a further increment of movement after a time lag interval.

12. In automatic means of the kind indicated and having a rudder, a tiller lever for operating the rudder, air-actuated means for moving the tiller lever and rudder, an interceptor valve for controlling the admission of air to the air-actuated means, the combination of resiliently mounted means constituting delay action train between the tiller lever and the interceptor valve, said train including a segmental lever having teeth on its larger end and pivoted on a fixed point at its smaller end, a shaft adjacent the toothed larger end, a pinion on said shaft in mesh with the teeth on the segmental lever, a fluid damper device mounted on said shaft, an air beater fan mounted on the shaft, a T-shaped lever fulcrumed at its lower end on the segmental lever, a spring extending in opposite directions from each side of the T-shaped lever to the segmental lever, an incoming actuating rod connecting the free end of the T-shaped lever with the tiller lever, an outgoing rod connected with the valve, and means for connecting the outgoing rod at any one of a number of positions between the free end and the fulcrumed end of said T-shaped lever.

13. In automatic means of the kind indicated and having a rudder, a tiller lever for operating the rudder, air-actuated means for moving the tiller lever, an interceptor valve for controlling the admission of air to the air-actuated means, a movement retarding mechanism, an incoming rod connecting said mechanism with the tiller lever, and a relay connecting said mechanism to the interceptor valve, said relay including a segmental lever, a link connecting one end of the segmental lever with said mechanism, a toothed rack at the other end of the segmental lever, an impeller drum, a shaft carrying said drum, a pinion on the shaft in mesh with the toothed rack, vanes on the impeller drum, a pair of fluid pressure supply nozzles by which air may be caused to impinge on said vanes to rotate the drum in one direction or the other, a valve lever fulcrumed centrally on the drum shaft, an arcuate valve on one end of the valve lever and mounted between the nozzles and the drum, and an outgoing rod pivoted to the other end of the valve lever and also to the segmental lever and connected with the interceptor valve, the arrangement being such that a linear movement of the link actuates the outgoing rod to close the interceptor valve and at the same time swings the arcuate valve to one side to interrupt the passage of pressure fluid from one of the nozzles and open the other nozzle to rotate the drum which through said pinion moves the outgoing rod in the reverse direction to again open the interceptor valve and cause a degree of permanent helm to be imparted to the rudder.

14. In automatic mechanism of the kind indicated and having a rudder, a tiller lever for operating the rudder, air-actuated means for moving the tiller lever, an interceptor valve for controlling the admission of air to the air-actuated means, a movement retarding mechanism, an incoming rod connecting said mechanism with the tiller lever, and a double relay device connecting said mechanism to the interceptor valve, said double relay device including a primary and secondary bladed impeller drums, a shaft supporting each drum, a pair of pressure fluid supply nozzles for each drum, a valve lever fulcrumed on the primary drum shaft, an arcuate valve on one end of said valve lever interposed between the primary drum and the related fluid pressure nozzles, a toothed pinion on each drum shaft, a segmental lever having teeth at its larger end meshing with each associated pinion, an incoming rod pivoted to the smaller end of the segmental lever of the secondary drum, a link freely connected at one end of the secondary drum shaft, and pivoted at its other end to the smaller end of the segmental lever of the secondary drum, a connecting link between the smaller ends of both segmental levers, an outgoing rod connected to the other end of the valve lever of the primary drum, and to the associated segmental lever and to the interceptor valve, a bell crank lever fulcrumed on the secondary drum shaft, an arcuate valve at one end of the bell crank lever arranged between the secondary drum and the associated nozzles, and a toothed rack on the other end of the bell crank lever in mesh with the pinion on the shaft of the primary drum, the arrangement being such that when the arcuate valve of the primary drum is opened and the related drum is rotated the movement transmitted through the bell crank lever causes opening of the valve of the secondary drum, the rotation of the secondary drum closing the valve of the primary drum and then re-opening it to reverse the rotation of the primary drum to thereby close the valve associated with the secondary drum for the purpose described.

15. In an automatic mechanism of the kind indicated and having a rudder, a tiller lever for operating the rudder, air-actuated means for moving the tiller-lever, an interceptor valve for controlling the admission of air to the air-actuated means, a movement retarding mechanism, an incoming rod connecting said mechanism with the tiller lever, and a relay device operatively connecting said mechanism to the interceptor valve, said relay device including an impeller drum, vanes on said drum, an air beater fan, a helical spring connecting the drum and the fan, an internally toothed annulus on the fan, planet wheels carried by the drum and meshing with the annulus, a sun pinion in mesh with the planet wheels, a shaft carrying the sun wheel, a pinion on the sun shaft, a segmental lever, a toothed rack on the larger end of the segmental lever, an incoming rod pivoted to the smaller end of the segmental lever, an outgoing rod extending to the interceptor valve also pivoted to the smaller end of the segmental lever, a valve lever of right angled form mounted on the sun wheel shaft and pivoted at one end to the segmental lever, an arcuate valve at the other end of the valve lever covering a part of the periphery of the impeller drum, and a pair of pressure fluid supply nozzles for driving the impeller drum in one direction or the other depending upon the position of the arcuate valve which is interposed between the nozzles and the impeller drum, the arrangement being such that the speed for closing the interceptor valve will be fast as compared with that for closing such valve when giving permanent rudder.

16. In automatic means of the kind indicated and having a rudder, a tiller lever for operating the rudder, air-actuated means for moving the rudder tiller lever, an interceptor valve for controlling the admission of air to the air-actuated means, and resiliently connected means between the tiller lever and the interceptor valve, said resiliently connected means including a segmental lever having teeth on its larger end and pivoted on a fixed point at its smaller end, a shaft adjacent the larger end of the lever, a pinion on said shaft in mesh with the teeth on the segmental lever, a fluid damper device on said shaft, an air-beater fan mounted on the shaft, a T-shaped lever fulcrumed on the segmental lever, a spring extending in opposite directions from each side of the lever, to the segmental lever, an incoming actuating rod connected to the T-shaped lever at a point on one side of its fulcrum, and an outgoing rod connected to the free end of the T-shaped lever on the other side of the fulcrum, whereby the incoming rod may transmit a free movement to the outgoing rod, but when the two levers render owing to the movement of the fulcrum of the T-shaped lever, the outgoing rod receives a slow and retarded reverse movement.

17. In automatic means of the kind indicated and having a rudder, a tiller lever for operating the rudder, air-actuated means for moving the tiller lever, an interceptor valve for controlling the admission of air to the air-actuated means, a mechanical delay action train between, and in operative connection with, both the tiller lever and the interceptor valve, said train including yielding devices and a zero stop, means for finely adjusting the interceptor valve in relation to the said yielding devices, said adjusting means including an adjustable link connected in said train, a pivoted lever connected at one end to said link, and an adjustable clamping device at the other end of the lever whereby upon the movement of the pivoted lever and link positions of the interceptor valve and the zero stop in the mechanical train may be mutually and accurately adjusted.

18. In automatic means of the kind indicated and having a rudder, a double ended tiller lever for operating the rudder, a yielding transmission between each end of the tiller lever and the rudder, said yielding transmission including a pair of two-armed levers, an operating connection from one arm of each two-armed lever to the respective end of the tiller lever, a center rod, a link extending from the other arm of each lever and connected to the center rod, a spring bearing for one end of the center rod, a triangular linked frame having a base part mounted centrally upon a fixed point in line with an axis passing through the center of the rudder and the spring bearing, a link pivoted at one end to the end of the center rod and at the other to the apex of the triangular frame, an actuating double armed lever for said rudder, and a transmission member from each end of the base part of the triangular frame to the respective ends of the rudder double armed lever, whereby for a constant amplitude of movement from the tiller lever, the rudder is actuated but is allowed to independently adjust itself to the forces acting externally thereupon.

19. In automatic means of the kind indicated and having a pivoted rudder, a double-ended tiller lever for operating the rudder, a yielding transmission between each end of the tiller lever and the rudder, said yielding transmission including a pair of two armed levers, an operating connection from one arm of each two armed lever to the respective ends of the tiller lever, a spring bearing, a fixed base supporting said bearing and disposed central to an axis passing through the spring bearing and the rudder pivot, a longitudinal rod mounted at one end in the spring bearing, links at the opposite end of the longitudinal rod extending in opposite directions therefrom and connected to the other arm of each of the two-armed levers, a pair of toggle links each pivoted at one end to the longitudinal rod, means whereby the other ends of the links are under pressure, a triangular linked frame having a base part mounted centrally upon a fixed point in line with an axis passing through the pivotal axis of the rudder and the spring bearing, a link pivoted at one end to the second mentioned end of the longitudinal rod and at the other to the apex of the triangular frame, a double armed lever on said rudder, and a transmission member from each end of the base part of the triangular frame to the respective ends of the double armed rudder lever, whereby for a constant amplitude of movement from the tiller lever, the rudder is actuated but is allowed to independently adjust itself to the forces acting externally thereupon.

20. Automatic mechanism for steering airborne craft and other vessels comprising in combination a rudder, a two armed tiller lever for operating said rudder, a pair of servo-motors for operating the tiller lever, selective gyroscope controlled fluid pressure means for actuating one or the other of the servo-motors, a pair of bell crank levers, one arm of each bell crank being actuated from the related end of the tiller lever, a linkage mechanism between the pair of levers and the rudder, said linkage mechanism including a longitudinal rod, a sprial spring connected with one end of the longitudinal rod, a fixed base for said spring centered on a longitudinal axis passing through the rudder axis, links extending in opposite directions from the longitudinal rod and pivoted to the respective other arms of the bell crank levers, a pair of toggle links connected at one end to, and extending in opposite directions from the longitudinal rod, a pair of lever arms centered at one end on the fixed base and connected to the other ends of the toggle links, helical springs arranged on opposite sides of the longitudinal rod, adapted to act upon the toggle links, a tension rod carrying said helical springs, and a self-adjusting link mechanism arranged between the longitudinal rod and the rudder.

21. Automatic mechanism for steering airborne craft and other vessels comprising in combination a rudder, a two armed tiller lever for operating said rudder, a pair of servo-motors for operating the tiller lever, selective gyroscope controlled fluid pressure means for actuating one or the other of the servo-motors, a pair of bell crank levers, one arm of each bell crank lever being actuated from the related end of the tiller lever, a linkage mechanism between the pair of levers and the rudder, said linkage mechanism including a longitudinal rod, a spiral spring connected with one end of the longitudinal rod, a fixed base for said spring centered on a longitudinal axis passing through the rudder axis, lateral links extending in opposite directions from the longitudinal rod and pivoted to the other arms of the bell crank levers, a pair of toggle links connected at one end to and extending in opposite directions from the longitudinal rod, a pair of lever arms centered at one end on the fixed base and connected to the other ends of the toggle links, helical springs arranged on opposite sides of the longitudinal rod adapted to act upon the toggle links, a tension rod carrying the helical springs, parallel levers, one of said parallel levers being movable about the rudder axis and the other being movable about a second axis, links connecting said parallel levers and forming a parallelogram therewith, a rod connecting the parallelogram to the lateral links and the longitudinal rod to swing the parallelogram and also stress the helical and spiral springs, the arrangement being such that for the constant amplitude of movement imparted to the swinging rod, such movement will be transmitted to the rudder through the parallelogram as will alloy the rudder to automatically assume a position that will balance the spring force against the external forces acting on the rudder.

WALTER GORDON WILSON.